(12) United States Patent
Voelkner et al.

(10) Patent No.: US 6,473,957 B1
(45) Date of Patent: Nov. 5, 2002

(54) METHOD AND DEVICE FOR CONNECTING OVERLAPPING FLAT PARTS

(75) Inventors: Wolfgang Voelkner, Dresden (DE); Gerald Effenberg, Haenichen (DE); Reinhard Mauermann, Dresden (DE)

(73) Assignee: Technische Universitaet Dresden, Dresden (DE)

( * ) Notice: Subject to any disclaimer, the term of this patent is extended or adjusted under 35 U.S.C. 154(b) by 0 days.

(21) Appl. No.: 09/787,751

(22) PCT Filed: Sep. 24, 1999

(86) PCT No.: PCT/DE99/03064
§ 371 (c)(1),
(2), (4) Date: Aug. 15, 2001

(87) PCT Pub. No.: WO00/18528
PCT Pub. Date: Apr. 6, 2000

(30) Foreign Application Priority Data

Sep. 25, 1998 (DE) .......................... 198 43 874
Sep. 24, 1999 (DE) .......................... 199 45 743

(51) Int. Cl.$^7$ ................................ B23P 11/00
(52) U.S. Cl. .................. 29/505; 29/522.1; 29/514; 29/715; 29/283.5; 72/67; 72/406
(58) Field of Search .................. 29/34 R, 432.1, 29/432.2, 514, 521, 522.1, 709, 716, 798, 238, 283.5, 505, 715; 72/67, 406, 525

(56) References Cited

U.S. PATENT DOCUMENTS 3,579,809 A * 5/1971 Wolf
4,208,766 A * 6/1980 Schleicher
4,459,735 A * 7/1984 Sawdon
4,651,140 A * 3/1987 Duggan
4,658,502 A * 4/1987 Eckold et al.
4,835,850 A * 6/1989 Eckold et al.
5,051,020 A * 9/1991 Schleicher
5,208,973 A * 5/1993 Sawdon
5,727,302 A * 3/1998 Sawdon
5,884,386 A * 3/1999 Blacket et al.

FOREIGN PATENT DOCUMENTS

| DE | 3923192 | * | 1/1991 |
| DE | 4009813 | * | 1/1991 |
| JP | 03-138046 | * | 6/1991 |
| WO | 9115316 | * | 10/1991 |
| WO | 9633031 | * | 10/1996 |

* cited by examiner

Primary Examiner—David P. Bryant
Assistant Examiner—Eric Compton
(74) Attorney, Agent, or Firm—Jordan and Hamburg LLP

(57) ABSTRACT

The invention relates to a method for connecting overlapping flat parts in a mechanical joining process, for example for connecting panels, using a mould stamp (1a) and a matrix which is provided with a recess, the parts to be connected being placed between the mould stamp and the matrix. The invention is characterized in that the active axial advancing movement of the mould stamp (1a) is impressed with a tumbling motion throughout the entire joining process or during a part of the joining process and will a variable stamping force (F) which is dependent on said tumbling motion, in or to produce a flow of material that is oriented towards the undercut (6). The invention also relates to a device for carrying out the inventive method.

9 Claims, 4 Drawing Sheets

METHOD AND DEVICE FOR CONNECTING OVERLAPPING FLAT PARTS

The invention relates to a method for connecting overlapping flat parts according to the generic term of claim 1. The invention also relates to a device for connecting overlapping flat parts according to the generic term of claim 4.

BACKGROUND OF THE INVENTION

From DE 40 09 813 C1 a device for connecting overlapping flat parts is known. Using this device sheets can be joined by the so-called clinching process. What is so special about this device is that in the perimeter range of the die recess a deformable material is provided which is softer than that of the sheets to be joined. This is to enable avoiding the usual division of the die.

From DE 39 23 182 C2 a device with a divided die is known for connecting flat parts arranged over each other using a punch. To support the components of the die a body is provided with complementary conical surfaces and on this body a return spring for preloading in the direction of the punch movement.

In clinching processes, using devices according to DE 40 09 813 C1 or DE 39 23 182 C2, a punch penetrates the sheets to be joined in a linear movement during the working stroke, while a fixed or divided die on the opposite side takes part in forming the so-called die side of the clinching spot. A counterpunch is positioned in the divided die.

The forming of the recess by the tools not only produces the effect of force closure but also the known form or self-closure, the so-called undercut, between the parts to be joined with the process carried out up to a pre-determined bottom thickness.

It is a disadvantage of clinching that great forces are required. This results in high loads acting on the tooling and the tooling frames, and limits the application of the method when high-strength sheet materials have to be joined.

Great requirements of the guidance of the tools result from the heavy joining loads, if high-accuracy coaxial alignment is required.

Heavy loads reduce the possible daylight of the C-frames, which are mainly used as tooling frames, and hence, limit the applicability of the method.

Because of the linear punch movement the thickness of the punch-side sheet is significantly reduced in the neck range and only little undercut is established, which limits the strength of the joint.

Superimposition of an orbiting motion onto a joining feeding movement is known from the method of orbital riveting. Orbital riveting is used for achieving self-closed connections by partial upsetting and stamping operations, e.g. at an auxiliary joining component.

SUMMARY OF THE INVENTION

It is the objective of this invention to reduce the forces to be applied for clinching. This aims at extending the field of application of this process concerning high-strength materials and the accessibility of C-frames for large workpieces. It is another objective of this invention to eliminate the process's weak points of low neck thickness and small undercut and thus to achieve higher joining strengths in equivalent joining jobs. Further, it is intended to make complicated dies unnecessary and reduce the demand for coaxial positioning of the punch and die as far as possible.

According to the invention, the problem is solved by a method with the features mentioned in claim 1. The sub-claims present other useful developments of the invention. Further, the problem is solved by a device with the features mentioned in claim 4. Useful developments of the invention follow from the features mentioned in claims 5 to 9.

In this method the axial feeding movement is superimposed with an orbital motion of the forming punch and a varying punch force with this orbital motion and varying punch force tuned to each other.

While the punch performs an orbital motion the punch force is controlled such that the punch force is increased during the travel of the contact area produced between the punch front face and the workpiece outwards from the centre of the clinching spot, and is decreased during the inward travel of this contact area.

Owing to the orbital motion the material is partially deformed so that the process forces are distinctly reduced. The varying punch force leads to the desired radial material flow from the centre in outward direction.

The said orbital motion can be superimposed to the axial feeding movement during the whole joining process or during a portion of the joining process.

According to the invention the forming punch is equipped with a mechanically driven mechanism, which sets this punch in motion. Further, a mechanism powered mechanically, servohydraulically, piezoelectrically or in other ways, is provided which feeds the forming punch with a varying force against the recess. The application of the varying punch force to the forming punch is evaluated and controlled dependent on the orbital position.

On the opposite side, the sheets are supported by a fixed or moving die with or without counterpunch, or on an even anvil only.

A special geometry of the forming punch in connection with the orbital motion ensures that more material is drawn into the forming zone at the beginning of the joining process. During the deformation and above all, at the end of the process material is radially pressed from the bottom area into the neck area, which is critical for the strength of the connection.

For this to occur the forming punch has a front end with radii R1/R2 and/or a taper and/or a tractrix curve, whereby when shaped with radii only, the radius R1 is greater than the maximum punch diameter and the radius R2 is smaller than the maximum punch diameter.

The counterpunch has a front end with a radius R3 and/or a taper and/or a tractrix curve, whereby when shaped with a radius only, the radius R3 is greater than the maximum punch diameter.

Advantageously, the forming punch has a punch undercut where the maximum punch diameter is tapered in such a way that any collision between the shank of the forming punch and the cylindrical portion of the punch-side sheet is avoided.

It is advantageous that a movable die has a die undercut where the die interior diameter is tapered to support the undercut at the joining spot.

Also a fixed die can be used. This fixed die should have a draft with an angle and/or transition curves between the die head and bottom.

BRIEF DESCRIPTION OF THE DRAWINGS

In the following, the invention is further explained by examples of embodiment. In the drawings it is shown by FIG. 1 the known clinching with divided die and counterpunch.

DESCRIPTION OF THE PREFERRED EMBODIMENTS

Figure 1:
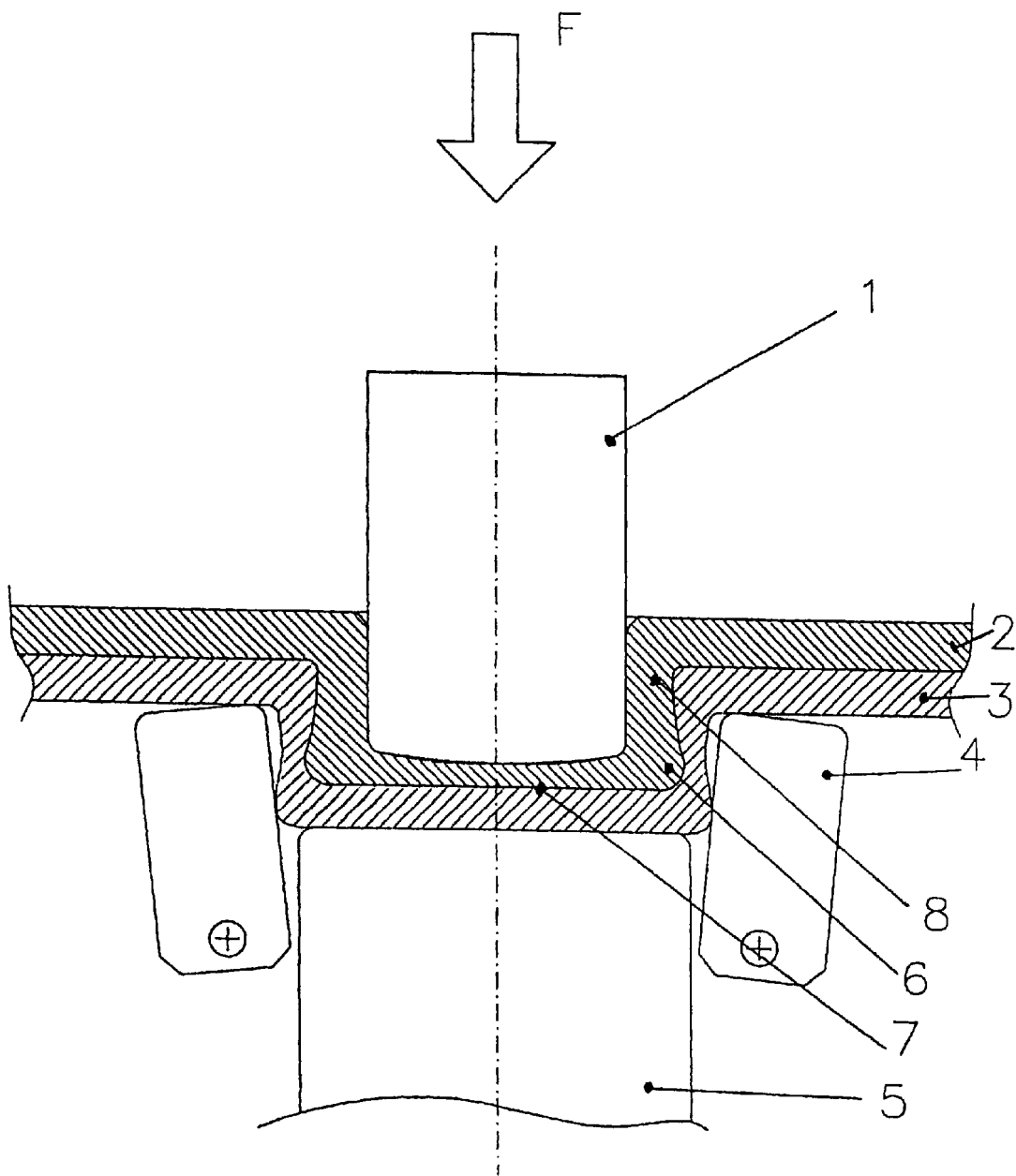

In FIG. 1 the known clinching with divided die 4 and counterpunch 5 is shown. The punch 1 performing an axial movement penetrates the sheets 2 and 3. The forming of the recess by the tools produces, apart from the effect of force closure, the known self-closure, the so-called undercut 6, between the parts to be joined with the process carried out up to a predetermined bottom thickness 7 and a neck zone 8 develops as criterion decisive for the strength of the joint.

Figure 2:
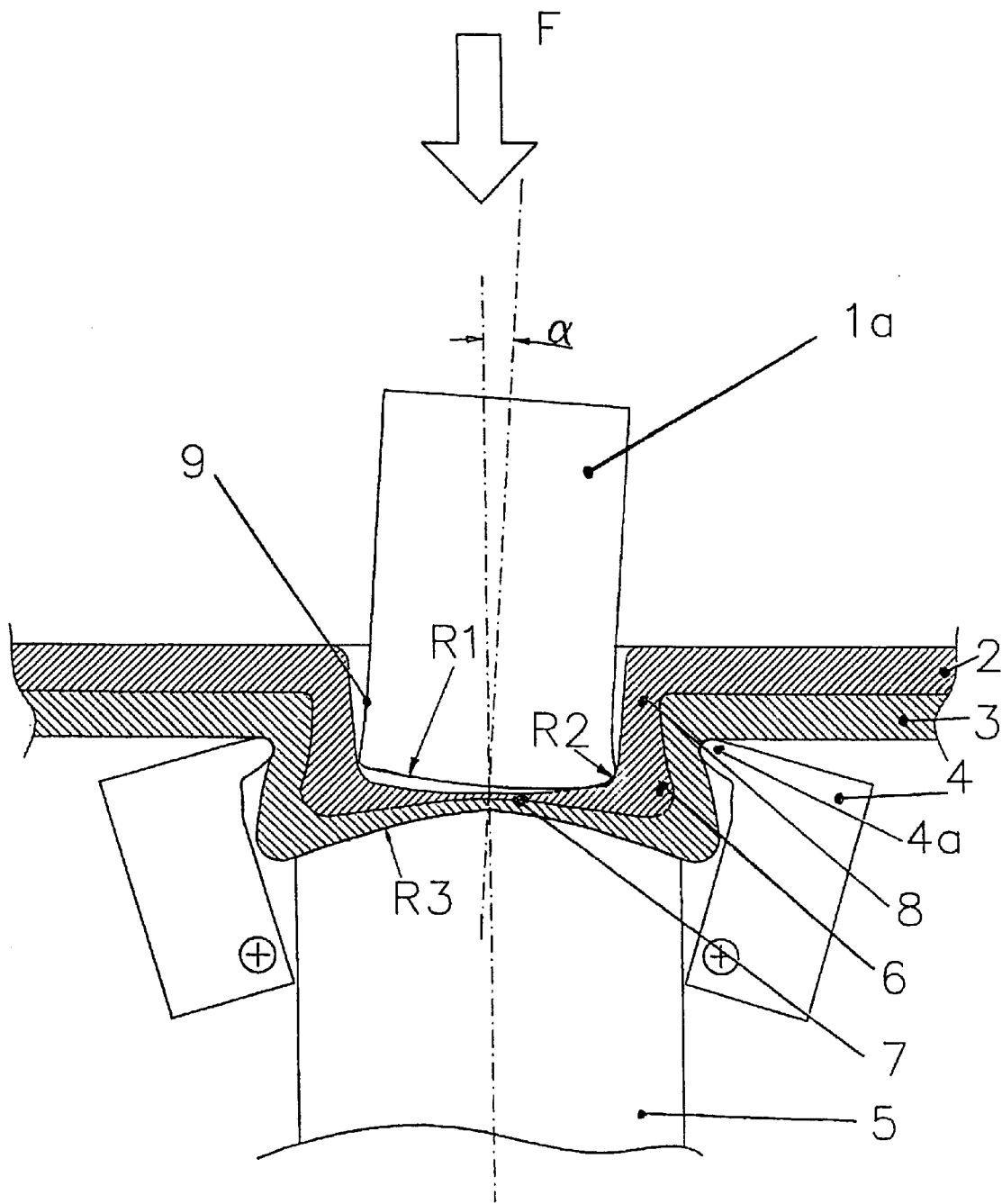
FIG. 2 a forming punch in displaced position at the end of the forming process.

In FIG. 2 the forming punch 1a is shown in displaced position at the end of the forming process.

Both sheets 2, 3 are pressed into a divided die 4, which has a die undercut 4a.

On the orbiting motion the forming punch 1a tilts by the angle a and in combined action with the radii R1/R2 of the forming punch 1a and counterpunch 5 the residual bottom thickness 7 is tapered deliberately and the material is forced radially outwards from the bottom zone.

Figure 3:
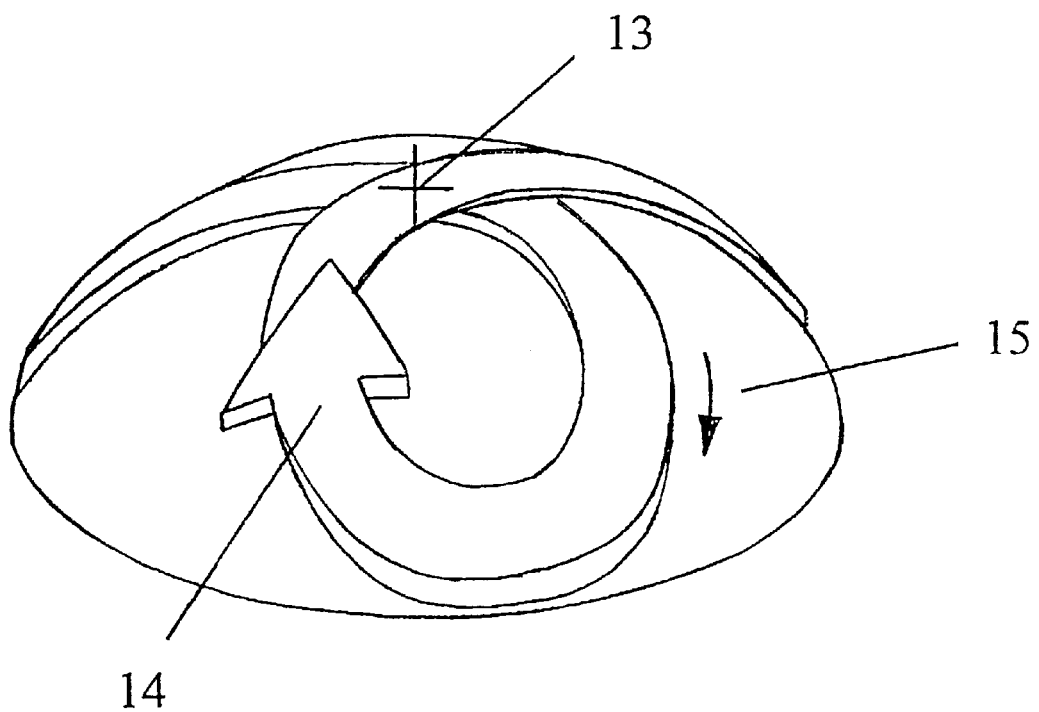
FIG. 3 a movement path of the contact area between punch front and material.

In FIG. 3 a path of an orbiting motion is presented. During the movement of the forming punch on a path in form of a rosette the centre of the clinching spot 13 is passed several times. When the movement is directed inwards in the direction of the centre of the clinching spot, 14, the punch force is decreased, in an extreme case down to zero. When the movement is directed outwards, 15, a high punch force F is realized.

So the punch force F is higher for an increasing value of a and hence forces the material radially outwards. This varying punch force is produced mechanically, servohydraulically, piezoelectically, or in other ways.

The developing special material flow and the die undercut 4a make possible a better forming of the critical neck zone 8 and of the undercut 6.

The punch undercut 9 of the forming punch 1a is prerequisite for a process that is horizontally free of displacement and enables a cylindrical inner contour of the joining spot.

Figure 4:
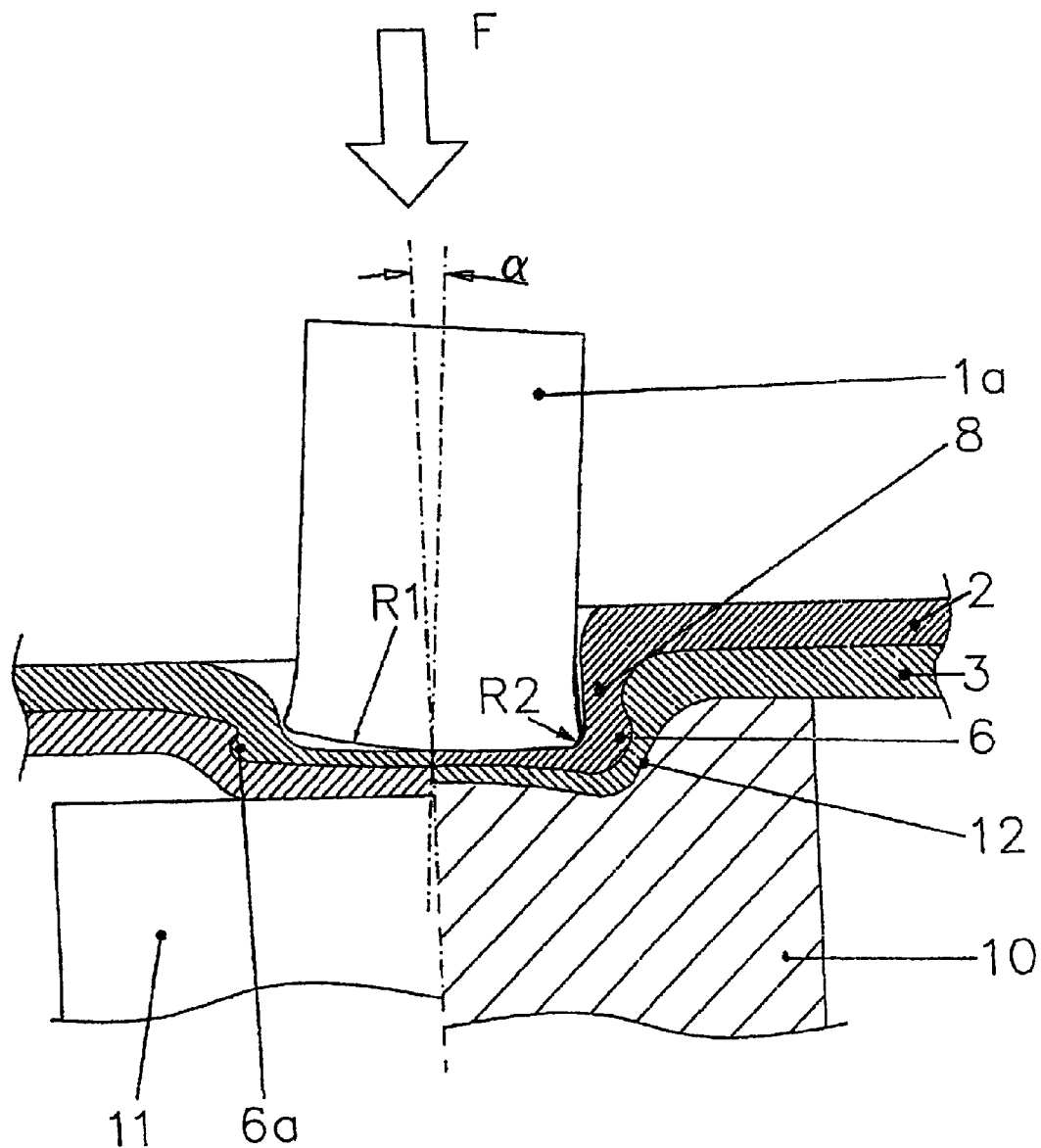
FIG. 4 a device with fixed die and even anvil.

In FIG. 4, on the right side of the centre line, the device with a fixed die 10 is shown and, on the left side of the centre line the device with an even anvil 11 is shown, at the lower dead point in each case.

Again, due to the material flow a well-formed neck zone 8 and an undercut 6 are formed with a small bottom thickness 7, whereby the undercut 6a is smaller but sufficient for many applications.

| Nomenclature | | |
|---|---|---|
| 1 | punch | |
| 1a | forming punch | |
| 2 | sheet | |
| 3 | sheet | |
| 4 | die | |
| 4a | undercut of the die | |
| 5 | counterpunch | |
| 6 | undercut | |
| 6a | undercut | |

| -continued | | |
|---|---|---|
| Nomenclature | | |
| 7 | residual bottom thickness | |
| 8 | neck zone | |
| 9 | undercut of the punch | |
| 10 | die | |
| 11 | anvil | |
| 12 | draft of the die | |
| 13 | centre of the clinching spot | |
| 14 | movement inwards in the direction of the centre of the clinching spot | |
| 15 | movement outwards | |
| F | varying punch force | |
| R1 | radius at the punch | |
| R2 | radius at the punch | |
| R3 | radius at the counterpunch | |

What is claimed is:

1. Method for connecting overlapping flat parts in a mechanical joining process by using a forming punch and a die provided with a recess between which the parts to be joined are positioned, wherein active axial feeding movement of the forming punch is superimposed with an orbital motion during the whole joining process or during a portion of the joining process and a varying punch force dependent on the orbital motion is applied so that a material flow directed to an undercut is produced.

2. Method according to claim 1, wherein the orbital motion of the forming punch is executed with a variable angle.

3. Method according to claim 1 or 2, wherein the varying punch force is of greater values for an increasing angle and is reduced to smaller values for a decreasing angle.

4. Device for connecting overlapping flat parts in a mechanical joining process, comprising a displaceable forming punch, a die provided with a recess between which the parts to be joined can be positioned, a mechanically powered mechanism which gives the forming punch an orbital motion, another powered mechanism which feeds the forming punch with a varying punch force against the recess of the die, and means for controlling the value of the punch force depending on the orbital position.

5. Device according to claim 4, wherein the forming punch has a front end shaped with radii R1 and R2 and/or a taper and/or a tractrix curve, and when the front end of the forming punch is shaped with radii only the radius R1 is greater than the maximum punch diameter and the radius R2 is smaller than the maximum punch diameter.

6. Device according to claim 4 or 5, further comprising a counterpunch that has a front end shaped with a radius R3 and/or a taper and/or a tractrix curve, whereby when the front end of the counterpunch is shaped with a radius R3 only, the radius R3 is greater than the maximum punch diameter.

7. Device according to claim 4 or 5, wherein the forming punch has a punch undercut and a shank and a maximum punch diameter is tapered in such a way that any collision between the shank of the forming punch and a cylindrical portion of a punch-side sheet is avoided.

8. Device according to claim 4 or 5, wherein the die is movable and has a die undercut at which a die interior diameter is tapered to support the undercut at a joining site.

9. Device according to claim 4 or 5, wherein the die is fixed and has a draft having an angle and/or transition curves between a head and a bottom of the die.

\* \* \* \* \*